United States Patent [19]

Nutter

[11] 4,042,146

[45] Aug. 16, 1977

[54] MAP VENDING MACHINE

[76] Inventor: Jack W. Nutter, 7500 W. Eightieth St., Los Angeles, Calif. 90045

[21] Appl. No.: 667,124

[22] Filed: Mar. 15, 1976

[51] Int. Cl.$^2$ .............................................. B65G 59/06

[52] U.S. Cl. .................................... 221/152; 221/271; 221/303

[58] Field of Search ............... 221/303, 213, 152, 271, 221/276, 261

[56] References Cited

U.S. PATENT DOCUMENTS

| | | | |
|---|---|---|---|
| 2,620,250 | 12/1952 | Pierson | 221/271 X |
| 2,681,842 | 6/1954 | Rabkin et al. | 221/152 X |
| 3,228,554 | 1/1966 | Huffman | 221/152 X |
| 3,872,997 | 3/1975 | Armstrong et al. | 221/213 X |

*Primary Examiner*—Stanley H. Tollberg

*Attorney, Agent, or Firm*—Huebner & Worrel

[57] ABSTRACT

A machine for vending folded paper items, such as maps, including a housing having forward amd rear walls, at least one channel-shaped chute supported within said housing, the chute being adapted to contain the folded paper items to be vended, a sliding ejector at the bottom of the chute supporting the items and having teeth to engage one of the items for sliding forward movement therewith, an exit slot in the forward wall of the housing for discharging the said one item as a result of the forward sliding movement of the ejector, a drive device in the housing to slide the ejector rearwardly from a forward position to a rearward position, and a tension spring connected to the chute and the ejector to return the ejector from the rearward position to the forward position, the one item being engaged for said forward movement when the ejector is adjacent the rearward position and being positioned for removal from the housing when the ejector has returned to the forward position. The invention also includes an anti-theft device, a novel weight for depressing the folded items, a device to prevent exit jamming, and ejector teeth in tapering rows.

6 Claims, 8 Drawing Figures

MAP VENDING MACHINE

BACKGROUND OF THE INVENTION

This invention relates to a coin operated vending machine for dispensing folded maps. In the prior art there have been such vending machines and the present invention presents substantial improvements over them. One of the problems in the prior machines has been a tendency for the maps to be damaged while they are being removed from the machine. The present invention functions to eliminate this condition.

Another problem in the prior art has been a tendency for more than one map to be moved toward the exit slot so as to tend to cause the maps to jam and prevent easy removal. Means have been provided in the present invention to eliminate such jamming.

The prior art machines also have a theft problem which has been overcome in the present invention with an antitheft device.

SUMMARY OF THE INVENTION

It is an object of the invention to provide an improved machine for vending folded paper items, such as maps.

It is another object of the invention to provide a machine, as described in the preceding paragraph, which is relatively inexpensive to manufacture and simple in construction.

It is still another object of the invention to provide a machine, as described in the preceding paragraphs, which has an improved mechanism for limiting discharge of only one map at a time. This device prevents jamming of the maps in the area of the exit slot.

It is a further object of the invention to provide an improved antitheft device adjacent the exit slot of the vending machine to prevent removal of the maps from the exterior thereof when a coin has not been inserted and to facilitate the discharge of a map when a coin has been employed to permit the actuation of the drive means.

It is a further object of the invention to provide an exit slot which is offset from the level of the ejector carrying the map to be discharged and to provide means for guiding the map from the ejector level into the slot.

It is a still further object of the invention to provide an ejector for machines, as described in the preceding paragraphs, having map engaging teeth on tapering or non-parallel rows, so as to eliminate or reduce the wear on and the tearing of the maps.

It is another object of the invention to provide a new weight structure for positioning on top of the maps in the machine and which, when the machine is empty, locks the drive means via the ejector to prevent the machine from receiving coins.

It is still another object of the invention to provide a machine, as described in the preceding paragraphs, having a relatively inexpensive drive means and ejector arrangement whereby when the drive means is manually withdrawn, after being pushed to drive the ejector, the ejector automatically carries a map into the slot for discharge.

It is a further object of the invention to provide a machine, as described in the preceding paragraphs, having a hinged door as a front wall having the exit slot therein. The door, when opened, carries the drive means out of the machine housing and permits easy access for filling the machine and removing the coins.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

BRIEF DESCRIPTION OF THE PREFERRED EMBODIMENT

Figure 1:
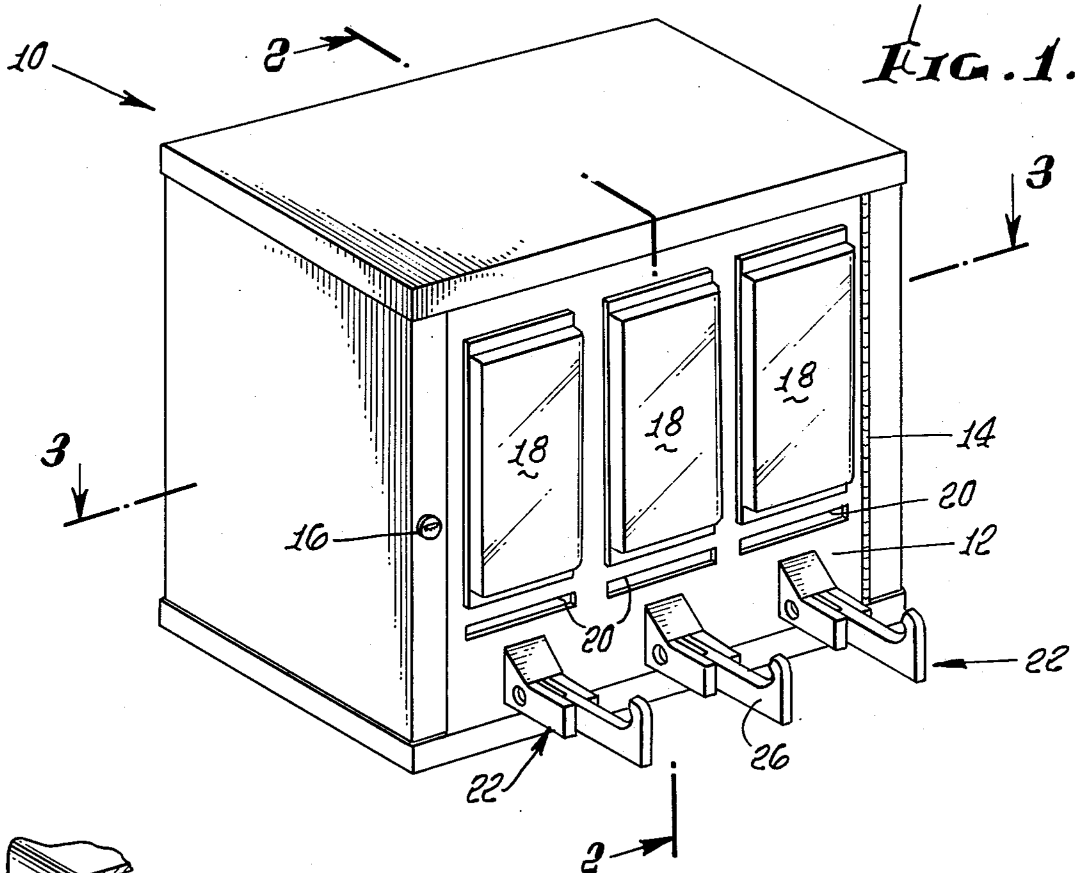
FIG. 1 is a perspective view of the exterior of the vending machine, according to the invention.

Referring again to the drawings, there is shown in FIG. 1 a map vending machine, generally designated as 10, having a front wall 12 which is hinged at 14 to the machine housing and which is openable for activity within the machine, such as, filling, repairing and removal of coins. The hinged wall 12 is locked for security at 16 for normal operation.

The wall 12 has three showcases 18 for containing samples of the maps to be vended. Below the showcases 18 are three exit slots 20 through which the maps are discharged when a coin has been inserted into one of three conventional coin operated drive means, generally designated as 22. This type of drive means is released for inward movement by the insertion of a coin, and after it has been pushed all the way in, it must be returned by hand to permit a map to be discharged through an exit slot 20.

Figure 2:
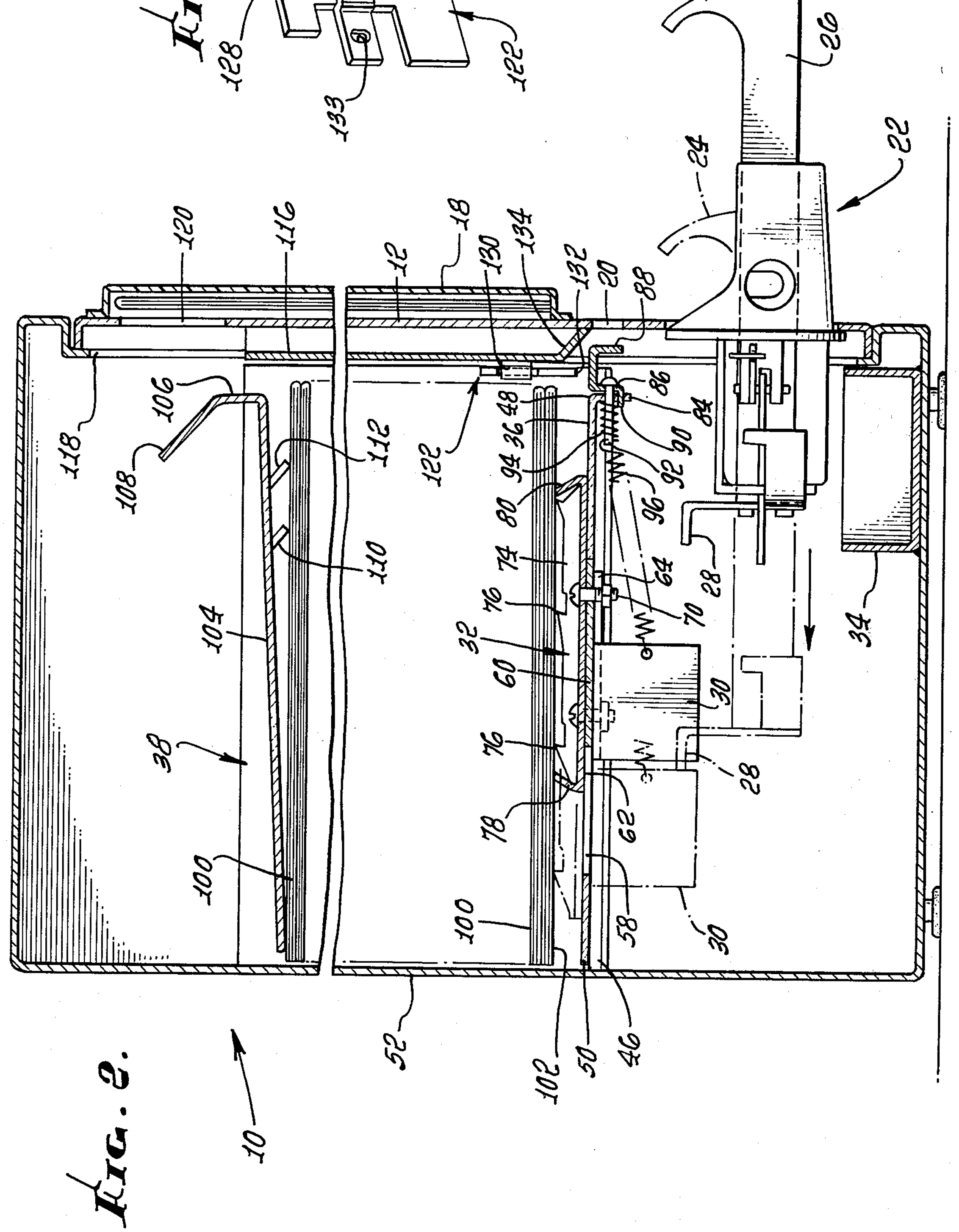
FIG. 2 is a cross-sectional view of the interior of the machine, taken along the lines 2—2 in FIG. 1.

In FIG. 2 the drive means 22 is shown having a manually operated handle 24 in full lines in its normal position, and is shown in broken lines in its inner or operated position. The handle is on the outer end of a slidable member 26 which on its inner end has a contact flange 28 which is engageable with a tang 30 connected to a map ejector 32. When the flange 28 is moved sufficiently inwardly into the machine housing the coin drops into a coin collecting box 34. Instructions on the exterior of the wall 12 indicate that after the handle 24 is moved inwardly, it must be withdrawn to the position shown in FIG. 2, so that the map can be positioned for discharge.

As shown in FIGS. 2-7, an ejector 32 is mounted for sliding engagement adjacent a bottom 36 of each of three channel-shaped map storing or carrying chutes, generally designated as 38. The chutes have generally parallel walls 40 and 42, extending upwardly from the channel bottom and have open ends and an open top.

Figure 7:
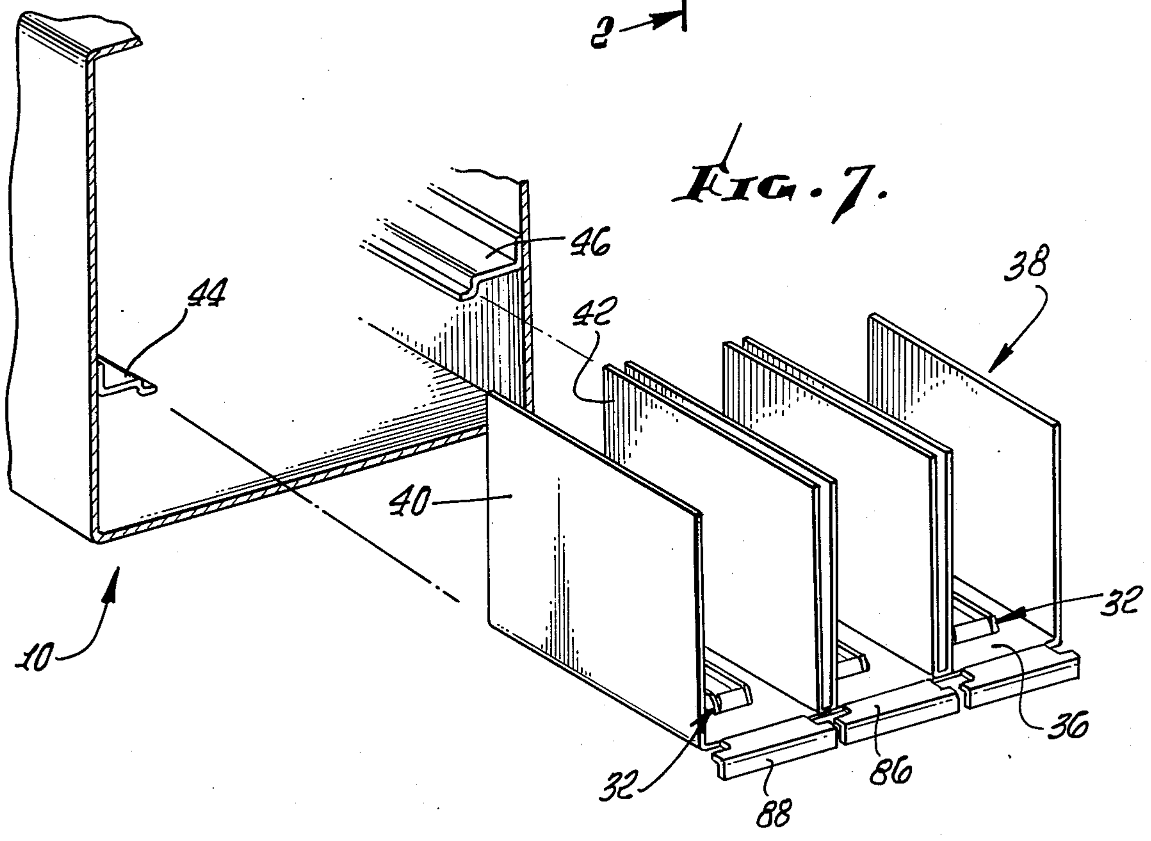
FIG. 7 is an exploded view illustrating the map-carrying chutes and a support means for the chutes within the machine.
Figure 8:
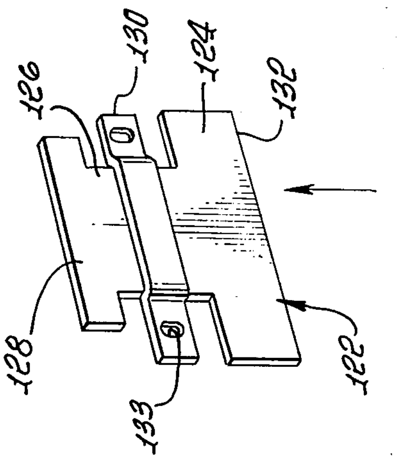
FIG. 8 is a perspective view of a device adapted to prevent the movement of more than one map into the discharge area.

As shown in FIG. 7, the three chutes are joined together and are adapted to be slidably engaged with and supported on brackets 44 and 46, extending inwardly from opposite side walls of the housing. Because the chutes are identical, the following description of one chute applies to all three and to their surrounding structures.

As shown in FIG. 2, the chute has a forward end 48 of its bottom adjacent the forward wall 12 of the housing and has a rearward end 50 adjacent the rearward wall 52 of the housing.

Figure 3:
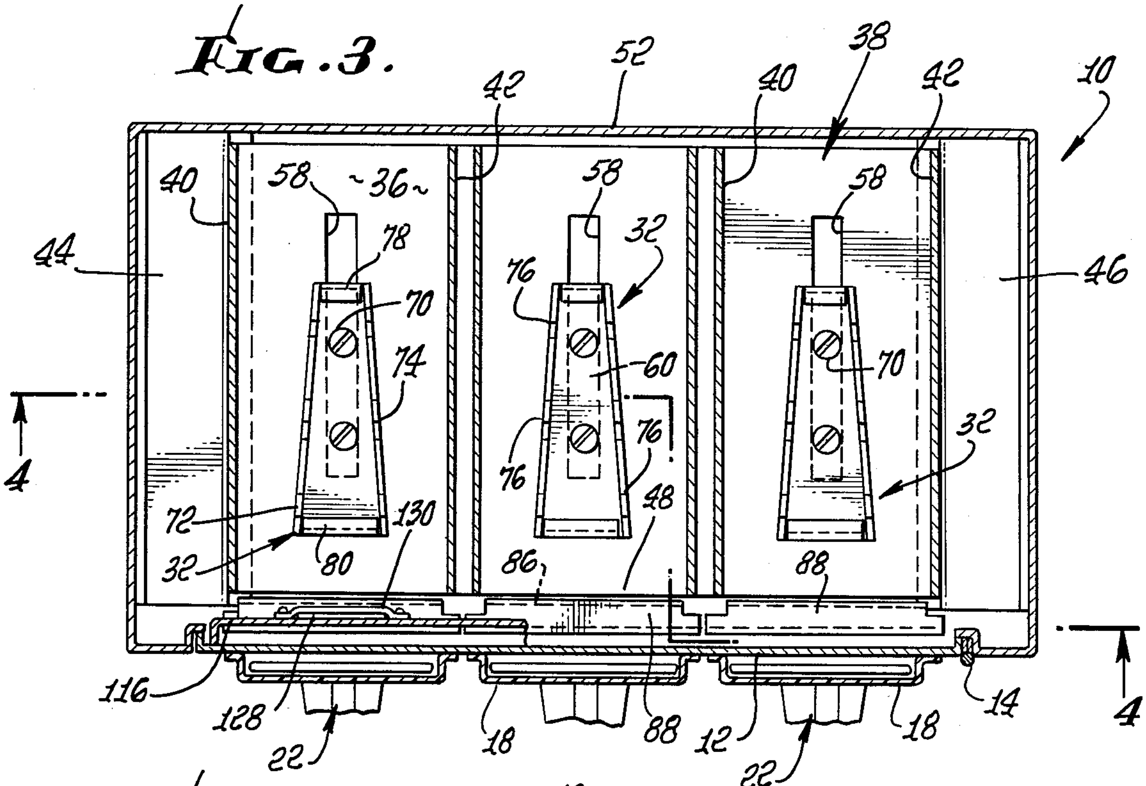
FIG. 3 is a cross-sectional plan view of the interior of the machine, taken along the lines 3—3 in FIG. 1.
Figure 4:
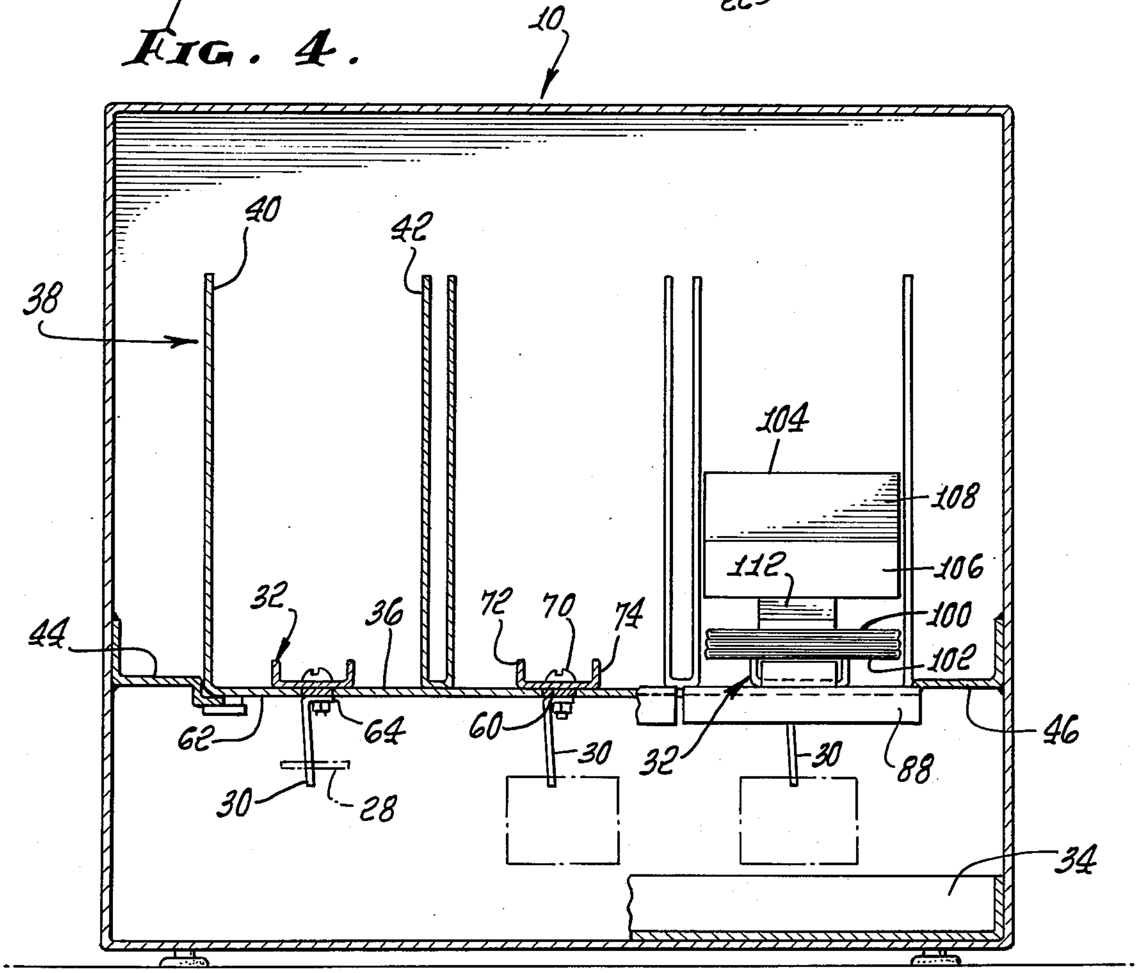
FIG. 4 is a cross-sectional elevational view, taken substantially along the lines 4—4 in FIG. 3.

As may be seen in FIGS. 2–4, there is a slot 58 through the chute bottom 36, the slot being elongated in the forward-rearward directions. Slidably engaged within the slot is a spacer strip 60 extending between a bottom 62 of the ejector and a flange 64 on the top of the tang 30. The flange 64 extends along the tang 30 and extends forwardly thereof. Bolts 70 secure the ejector, the spacer 60 and the tang and its flange 64 for slidable movement with respect to the bottom 36 of the chute, the bolts passing through the slot 58.

As shown in FIG. 3, the ejector has vertical side walls 72 and 74 tapering from the forward to the rearward direction. Each of the walls has a plurality of upwardly and forwardly extending teeth 76 for engaging an adjacent map for forward slidable movement therewith. The purpose of the teeth 76 being in non-parallel rows is to avoid contact of the teeth along continuous straight line surfaces on the maps. If there is relative movement between a map and the teeth, and if all the teeth in a row make contact in a single straight line row on the map, then there is a tendency to wear or tear the map along that row. By having the teeth, as shown, spaced laterally differently from the forward to the aft positions, each tooth is in a different lateral position so as to eliminate the wearing or tearing on the maps. The ejector has upwardly and inwardly extending end flanges 78 and 80 at their rearward and forward ends, respectively.

Figure 5:
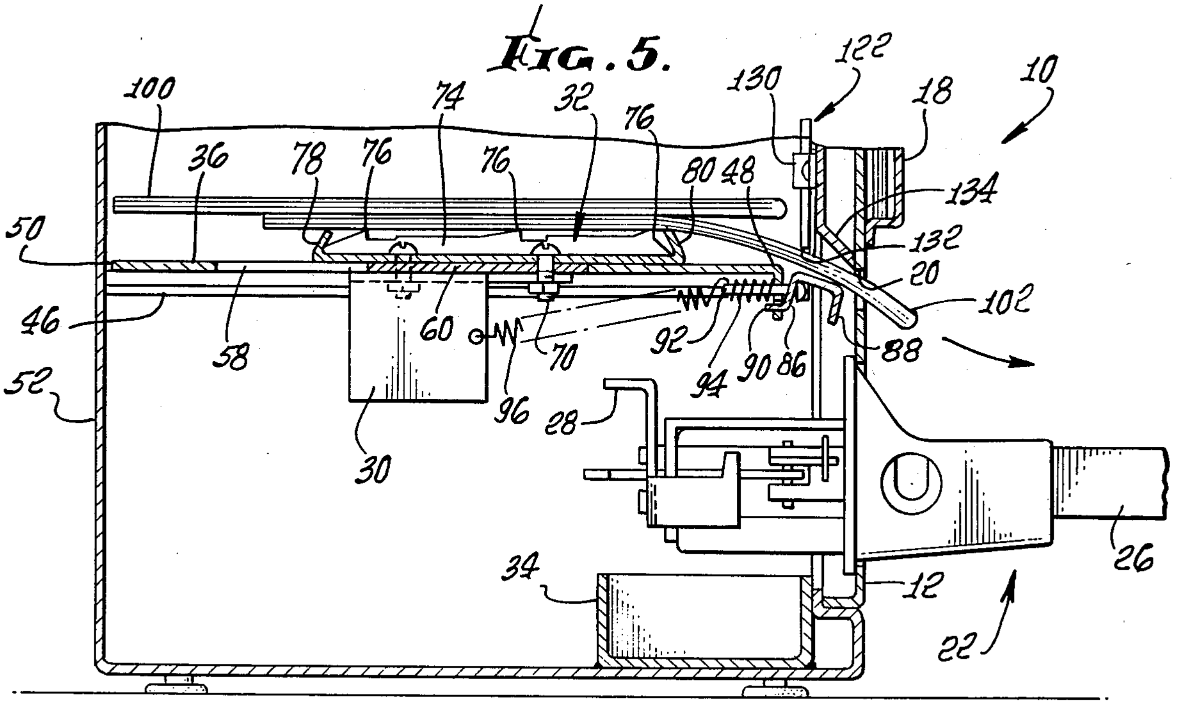
FIG. 5 is a fragmentary cross-sectional view, similar to FIG. 2, and illustrating a map in discharge position.

As shown in FIG. 2, the chute has a downwardly extending flange 84 at its forward end 48. In abutment with the flange 84 is a wall 86 of an inverted channel member or slot guard 88. As shown in FIGS. 3 and 7, the wall 86 does not extend to the channel ends. Extending rearwardly from the lower end of the wall 86 are two spaced parallel pins 90, the pins 90 extending loosely through two horizontal openings in the flange 84 to form a loose hinge or pivotal connection. Extending through the wall 86 and the flange 84 is a pin 92 having a head in abutment with the outer face of the wall 86 and a compression coil spring 94 in abutment with the inner face of the flange 84, the spring being connected to the rearward end of the pin. The spring 94 holds the flange 84 and the wall 86 in abutment, but when downward pressure is exerted on the channel member 88, as shown in FIG. 5, it pivots downwardly against the force of the spring 94 in the manner of a loose hinge with respect to the flange 84. The inverted channel 88, extending transversely with respect to the chute, is spaced inwardly from and in register with the slot 20, so as to provide an antitheft device to prevent removal of maps through the slot when the drive means has not been coin actuated.

Also connected to the inner end of the pin, independently of the spring 94, is one end of a tension spring 96; the other end of the spring 96 is connected to a forward portion of the tang 30. When the drive means is moved inwardly and rearwardly against the force of the spring 96, by pushing the handle 24, and the flange 28 engages the tang 30, the latter is moved to the position shown in broken lines in FIG. 2 and similarly the ejector 32 is removed from its normal forward position to its rearward position.

Figure 6:
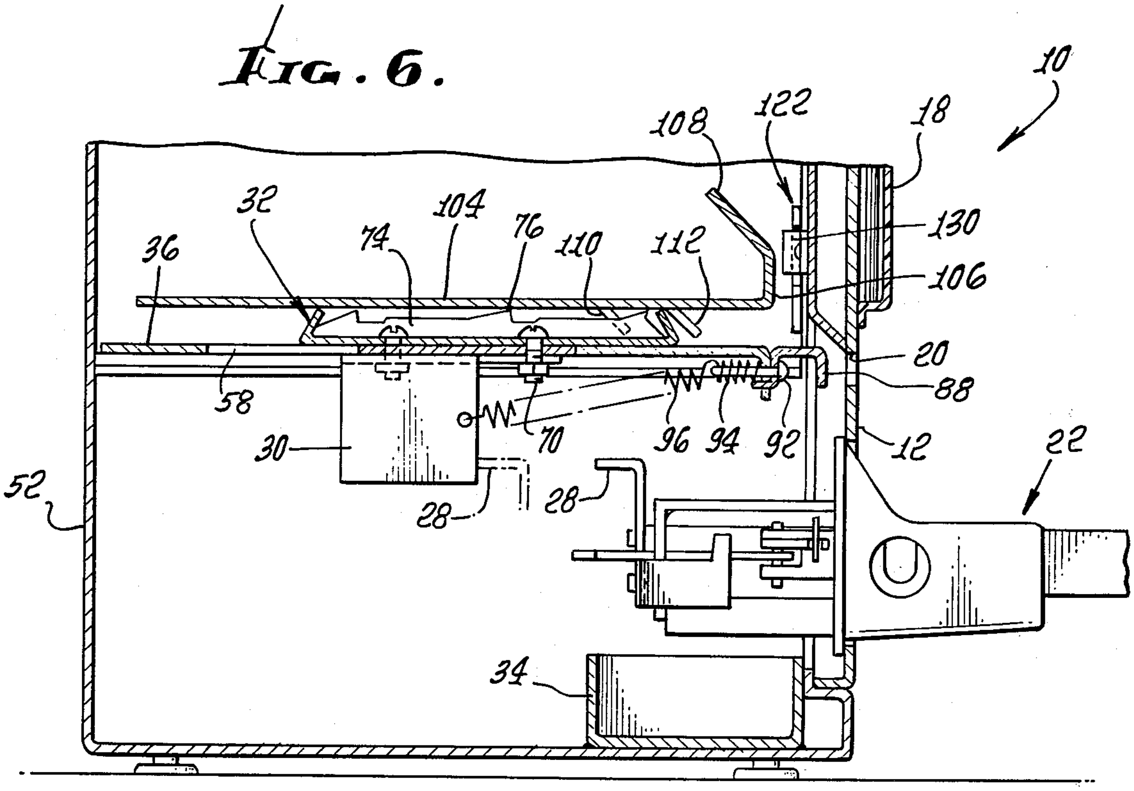
FIG. 6 is a cross-sectional view, similar to FIG. 2, illustrating the locking action of the weight when the machine is empty.

As shown in FIGS. 2 and 4, the folded maps 100, elongated in the fore and aft direction, are positioned in the chute closely adjacent its side walls. The lowest map, designated as 102, is in contact with and is supported by the ejector. At the top of the maps there is positioned a weight 104 to maintain the maps in pressure relationship with the ejector and each other. The weight is generally of hook shape having upwardly directed, forward end walls 106 and 108. It is of a length to fit loosely within the chute in the forward and rearward directions, and in the transverse direction, as shown in FIG. 4, fits relatively closely with the side walls of the chutes. Extending forwardly and downwardly from the underside of the weight are two narrow, locking tangs 110 and 112 adapted to fit within the ejector when the chute is empty so that one of them is adapted to be engageable with the upwardly directed flange 80 on the ejector, as shown in FIG. 6.

As shown in FIGS. 2–6, inwardly of the forward wall 12, and spaced therefrom, is an inner wall 116 having openings 118 adjacent the top and which are in register with openings 120 adjacent the inner tops of the showcases. The openings at 118 and 120 permit the entry of a sample map to be inserted into the showcases so as to indicate the types of maps in the respective chutes.

As may be seen in FIGS. 2–6 and 8, forwardly of the chute, secured adjacent the lower end of the wall 116, is a stop plate 122 having the shape of an inverted T. At the lower end it has an elongated T-bar portion 124 from which extends a T-leg 126 terminating in a T-base 128. The stop 122 is secured to the wall 116 by cap screws and a bracket 130 in which it is slidable upwardly and downwardly. The bracket 130 has slotted holes 133 to receive the cap screws, the slotted holes permitting vertical adjustments of the plate for different map thicknesses.

The stop at-rest position, as shown in FIG. 2, is such that the T-bar 124 is in register with at least two maps or folded items resting on the ejector, and its lower end 132 is vertically below the upper level of the ejector. At the lower end of the wall 116, extending upwardly and inwardly adjacent the slot 20, is a guide wall portion 134. As shown in FIG. 2, the upper end of the guide wall portion is above the lower end 132 of the stop 122 when the latter is in its lowest position, about one map thickness above the level of the chute bottom. The plate 122 floats freely and remains in contact with an exiting map, moving upwardly, for example, if a map is wrinkled or folded twice so as to make the map thicker behind the leading edge.

In operation, referring to FIGS. 2, 5 and 6, a chute 38 is shown filled with maps or other folded items 100, with the item 102 at the bottom in contact with the ejector. To cause the item 102 to be ejected through the slot 20, a coin is fed into the drive means 22 so as to release the lever 26 so that it may be pushed inwardly-rearwardly to cause the flange 28 to make contact with the tang 30. When it is moved a predetermined distance rearwardly, the coin is dropped into the coin box and the tang is moved rearwardly to position the ejector in the rearward, broken-line position, shown in FIG. 2. When the ejector is in its rearward position, the forward ends of the maps are lowered, by their own weight and the weight 104, so that the forward part of the map 102 is in contact with the chute bottom.

When the handle 24 is pulled outwardly, in accordance with the instructions, to its outer position, the tank and ejector are automatically returned to the forward position by the force of the tension spring 96. When this movement starts, the teeth 76 engage the bottom surface of the item 102 so that it is moved forwardly to move under the plate 122 and into contact with the guide wall surface 134 and the upper surface of the antitheft channel 88. Because the strength of the spring 96 is substantially greater than that of the spring 94, the channel 88 is pivoted downwardly on its loose hinge to the position shown in FIG. 5 to permit the item 102 to move partially out of the slot 20 to a position where it can be gripped by the operator and withdrawn from the machine. The spring 94 is strong enough to hold the channel 88 high enough so that the forward end of the item moves into the slot without difficulty.

When the item or map 102 makes contact with the end 132 of the plate 122, it may push the plate upwardly a slight amount, as shown in FIG. 5, so that the plate does not interfere with its movement along the surface 134 and into the slot. If a map 100, as shown in FIG. 5, should tend to be drawn forwardly along with the map 102, it will be stopped by the plate 122 and prevented from moving downwardly into a possible jamming position in contact with the wall portion 134. Because the plate 132 will always slide downwardly by the force of its own weight, it will be in contact with the top of the map 102 until it is withdrawn from thereunder. This prevents a second map from coming between the end 132 of the plate and the first map. After a map is withdrawn from the machine, the ejector is left in its forward position ready to be moved rearwardly by the drive means.

As shown in FIG. 6, when the chute is empty, the weight 104 comes to rest on the ejector flanges 78 and 80 and one of the tangs 110 or 112 is positioned inwardly and rearwardly of the flange 80 within the ejector walls 72 and 74. The tangs 110 and 112 are in predetermined positions so that at least one of them will be rearwardly of the flange 80. The weight 104 has room to be movable forwardly and rearwardly so that it will not engage a moving map sufficiently to tear it or mark it as it might if it could not move. In FIG. 2, the weight is in a relatively rearward position, whereas in FIG. 6, it is shown to have been moved forwardly.

Thus, when a tang of the weight is within the ejector and a coin is inserted into the drive means, the drive means can be moved a predetermined distance after the flange 80 makes contact with the locking tang 110, as may be understood from FIG. 6, and until the ejector moves the rearward end of the weight into engagement with the rearward wall 52 of the housing. When this occurs, the flange 28 on the drive means cannot be moved farther rearwardly, and at this point the coin will not have dropped from the drive means so that when the operator moves it to its outer position the coin is available to him for removal. That is, the operator will in this situation quickly determine that the drive means is not going to move rearwardly very far and that the machine is not operating so as to discharge a map, and it will become apparent on his withdrawing of the drive means, that his coin has been returned, and that a map is not available to him.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore being merely by way of example. I do not wish to be restricted to the specific form shown or uses mentioned except as defined in the accompanying claims, wherein various portions have been separated for clarity of reading and not for emphasis.

I claim:

1. In a machine for vending folded paper items,
a housing having forward and rear walls,
a channel-shaped chute supported within said housing,
said chute being adapted to contain said items for vending, said chute having a bottom and said items being adapted to extend upwardly from adjacent the bottom of the chute,
slide means adjacent the bottom of said chute and associated therewith to support said items, said slide means being adapted to slide forwardly and rearwardly relative to said chute and having means to engage one of said items for sliding forward movement therewith,
an exit slot in the forward wall of said housing to permit the removal of one of said items as the result of said forward sliding movement,
drive means in said housing to slide said slide means rearwardly in said housing from a forward position to a rearward position,
the improvement comprising:
biasing means associated with said chute and said slide means to return said slide means from the rearward position to the forward position, said one item being engaged for said forward movement adjacent said rearward position by said means to engage and being positioned after said forward movement for removal from the housing when said slide means has returned to said forward position,
said means to engage on said slide means being upwardly and forwardly directed teeth for engaging said one item while said slide means is being returned from the rearward position to the forward position,
said teeth being arranged in non-parallel rows extending in the generally forwardly direction,
said slide means being secured to the channel bottom of said chute,
a forwardly-rearwardly directed slot in said channel bottom,
said slide means having means attached thereto adapted to slide in said slot, and
a tang extending downwardly from said slide means below said bottom for driving engagement by said drive means,
said drive means being secured to said forward wall and being adapted to drive in the rearward direction,
said drive means having a handle exteriorly of said housing and being adapted to be manually moved in the forward and rearward directions by said handle,
said forward wall being hinged to said housing for opening and closing said housing,
said drive means being moved out of said housing when said wall is moved on the hinge to open the housing,
said chute being accessible for filling with said items when said housing is opened.

2. The invention according to claim 1 in which:
said chute is slidably removable when said housing is open.

3. In a machine for vending folded paper items,
a housing having forward and rear walls,
a channel-shaped chute supported within said housing,
said chute being adapted to contain said items for vending, said chute having a bottom and said items being adapted to extend upwardly from adjacent the bottom of the chute,
slide means adjacent the bottom of said chute and associated therewith to support said items, said slide means being adapted to slide forwardly and rearwardly relative to said chute and having means to engage one of said items for sliding forward movement therewith,
an exit slot in the forward wall of said housing to permit the removal of one of said items as the result of said forward sliding movement,
drive means in said housing to slide said slide means rearwardly in said housing from a forward position to a rearward position,
the improvement comprising:
biasing means associated with said chute and said slide means to return said slide means from the rearward position to the forward position, said one item being engaged for said forward movement adjacent said rearward position by said means to engage and being positioned after said forward movement for removal from the housing when said slide means has returned to said forward position, and
slot guard means associated with said chute adjacent said forward wall and said exit slot to prevent removal of the items through the slot from the exterior of the housing and to permit positioning of said one item into position for removal when said slide means has returned to said forward position,
said slot guard means being pivotally secured to a forward edge of said channel bottom and extends in transverse direction with respect to the channel,
said exit slot being elongated in said transverse direction and being in register with said slot guard means,
said slot guard means being biased to be in register with said exit slot and being movable downwardly substantially out of register from said exit slot when said one item is positioned for removal when said slide means has returned to said forward position.

4. In a machine for vending folded paper items,
a housing having forward and rear walls,
a channel-shaped chute supported within said housing,
said chute being adapted to contain said items for vending, said chute having a bottom and said items being adapted to extend upwardly from adjacent the bottom of the chute,
slide means adjacent the bottom of said chute and associated therewith to support said items, said slide means being adapted to slide forwardly and rearwardly relative to said chute and having means to engage one of said items for sliding forward movement therewith,
an exit slot in the forward wall of said housing to permit the removal on one of said items as the result of said forward sliding movement,
drive means in said housing to slide said slide means rearwardly in said housing from a forward position to a rearward position,
the improvement comprising:
biasing means associated with said chute and said slide means to return said slide means from the rearward position to the forward position, said one item being engaged for said forward movement adjacent said rearward position by said means to engage and being positioned after said forward movement for removal from the housing when said slide means has returned to said forward position,
said exit slot being offset from said means to engage on said slide means,
said means to engage on said slide means being upwardly and forwardly directed teeth for engaging said one item while said slide means is being returned from the rearward position to the forward position,
said teeth being arranged in non-parallel rows extending in the generally forwardly direction,
said drive means being secured to said forward wall and being adapted to drive in the rearward direction,
said drive means having a handle exteriorly of said housing and being adapted to be manually moved in the forward and rearward directions by said handle,
said forward wall being hinged to said housing for opening and closing said housing,
said drive means being moved out of said housing when said wall is moved on the hinge to open the housing,
said chute being accessible for filling with said items when said housing is opened.

5. The invention according to claim 4, in which:
said chute is slidably removably when said housing is open.

6. In a machine for vending folded paper items,
a housing having forward and rear walls,
a channel-shaped chute supported within said housing,
said chute being adapted to contain said items for vending, said chute having a bottom and said items being adapted to extend upwardly from adjacent the bottom of the chute,
slide means adjacent the bottom of said chute and associated therewith to support said items, said slide means being adapted to slide forwardly and rearwardly relative to said chute and having means to engage one of said items sliding forward movement therewith,
an exit slot in the forward wall of said housing to permit the removal of one of said items as the result of said forward sliding movement,
drive means in said housing to slide said slide means rearwardly in said housing from a forward position to a rearward position,
the improvement comprising:
biasing means associated with said chute and said slide means to return said slide means from the rearward position to the forward position, said one item being engaged for said forward movement adjacent said rearward position by said means to engage and being positioned after said forward movement for removal from the housing when said slide means has returned to said forward position.
said exit slot being offset from said means to engage on said slide means, said means to engage on said slide means being upwardly and forwardly directed teeth for engaging said one item while said slide means is being returned from the rearward position to the forward position, said teeth being arranged in non-parallel rows extending in the generally forwardly direction, said slide means being secured to the channel bottom of said chute, a forwardly-rearwardly directed slot in said channel bottom, said slide means having means attached thereto adapted to slide in said slot, and a tang extending downwardly from said slide means below said bottom for driving engagement by said drive means, said biasing means associated with said chute being a tension spring under said channel bottom, and means on said chute adjacent a forward end thereof having one end of said spring connected thereto, the other end of said spring being connected to said tang adjacent a forward end thereof.

* * * * *